(12) United States Patent
Pampaiah et al.

(10) Patent No.: US 11,329,890 B2
(45) Date of Patent: May 10, 2022

(54) NETWORK-AWARE WORKLOAD MANAGEMENT USING ARTIFICIAL INTELLIGENCE AND EXPLOITATION OF ASYMMETRIC LINK FOR ALLOCATING NETWORK RESOURCES

(71) Applicant: Hewlett Packard Enterprise Development LP, Houston, TX (US)

(72) Inventors: Jyothi M Pampaiah, Bangalore Karnataka (IN); Murali Nidugala, Bangalore Karnataka (IN); Viratkumar Maganlal Manvar, Bangalore Karnataka (IN); Aditya Bigganahalli Satyanarayana, Bangalore Karnataka (IN); Ravi Teja Jammulapati, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/878,968

(22) Filed: May 20, 2020

(65) Prior Publication Data

US 2021/0367855 A1 Nov. 25, 2021

(51) Int. Cl.
*G06F 15/173* (2006.01)
*H04L 41/16* (2022.01)
(Continued)

(52) U.S. Cl.
CPC ............. *H04L 41/16* (2013.01); *G06N 20/00* (2019.01); *H04L 41/12* (2013.01); *H04L 41/14* (2013.01); *H04L 47/25* (2013.01)

(58) Field of Classification Search
CPC ......... H04L 41/16; H04L 41/14; H04L 47/25; H04L 41/12; G06N 20/00
See application file for complete search history.

(56) References Cited

U.S. PATENT DOCUMENTS 8,359,223 B2 1/2013 Chi et al.
8,364,820 B2 * 1/2013 Madani ................ G06F 9/5061
709/226
(Continued)

FOREIGN PATENT DOCUMENTS

EP 3096227 A1 11/2016
WO 2017/172276 A1 10/2017

OTHER PUBLICATIONS

Gen Z, "The Gen-Z Consortium", available online at <https://web.archive.org/web/20200411074915/https://genzconsortium.org/>, Gen-Z Consortium, Apr. 11, 2020, 4 pages.
(Continued)

*Primary Examiner* — Hua Fan
(74) *Attorney, Agent, or Firm* — Trop, Pruner & Hu, P.C.

(57) ABSTRACT

Systems which support an asymmetric link define rules and policies in each individual physical layer. An asymmetric link is a physical layer with a different number of transmit versus receive lanes. Asymmetric links enable physical layers to optimize performance, power, and system resources based on the required data bandwidth per direction across a link. Modern applications exhibit large demands for high memory bandwidth, i.e., more memory channels and larger bandwidth per channel. The utilization data, patterns) of link usage, and/or patterns) of lane usage may be gathered to exploit the facilities provided by asymmetric links. An engine includes AI-fueled analytics to monitor, orchestrate resources, and provide optimal routing, exploiting asymmetric links, lane polarity, and enqueue-dequeue in a computing ecosystem.

17 Claims, 5 Drawing Sheets

(51) Int. Cl.
    *G06N 20/00*     (2019.01)
    *H04L 47/25*     (2022.01)
    *H04L 41/14*     (2022.01)
    *H04L 41/12*     (2022.01)

(56) References Cited

U.S. PATENT DOCUMENTS

| | | | |
|---|---|---|---|
| 9,432,298 B1* | 8/2016 | Smith | H04L 49/9057 |
| 10,536,518 B1* | 1/2020 | Streete | H04L 67/10 |
| 2016/0142265 A1 | 5/2016 | Dube et al. | |
| 2019/0050365 A1* | 2/2019 | Kopzon | G06F 13/4282 |
| 2019/0139185 A1* | 5/2019 | Baggerman | G06T 1/60 |
| 2020/0089522 A1* | 3/2020 | Qiu | H04L 41/083 |

OTHER PUBLICATIONS

Wren et al., "Azure Monitor Overview", available online at <https://docs.microsoft.com/en-us/azure/azure-monitor/overview>, Microsoft, Jul. 10, 2019, 13 pages.

* cited by examiner

NETWORK-AWARE WORKLOAD MANAGEMENT USING ARTIFICIAL INTELLIGENCE AND EXPLOITATION OF ASYMMETRIC LINK FOR ALLOCATING NETWORK RESOURCES

BACKGROUND

Scalable, universal system interconnects intended to unify communications, simplify designs and solution architectures, and improve interoperability have been proposed. Such systems may use a memory-semantic (i.e., read-write) protocol that enables multiple component types to efficiently communicate, which may enable creating disaggregated, composable solutions which may have the ability to logically compose systems with required compute and memory resources that may exist as fluid pools of resources and may be connected through fabric switches. A logical system may be created by dynamically binding the compute and memory resources connected via the, e.g., fabric switches.

BRIEF DESCRIPTION OF THE DRAWINGS

The invention of the present application will now be described in more detail with reference to exemplary embodiments of the apparatus and method, given only by way of example, and with reference to the accompanying drawings, in which.

and

Figure 6:
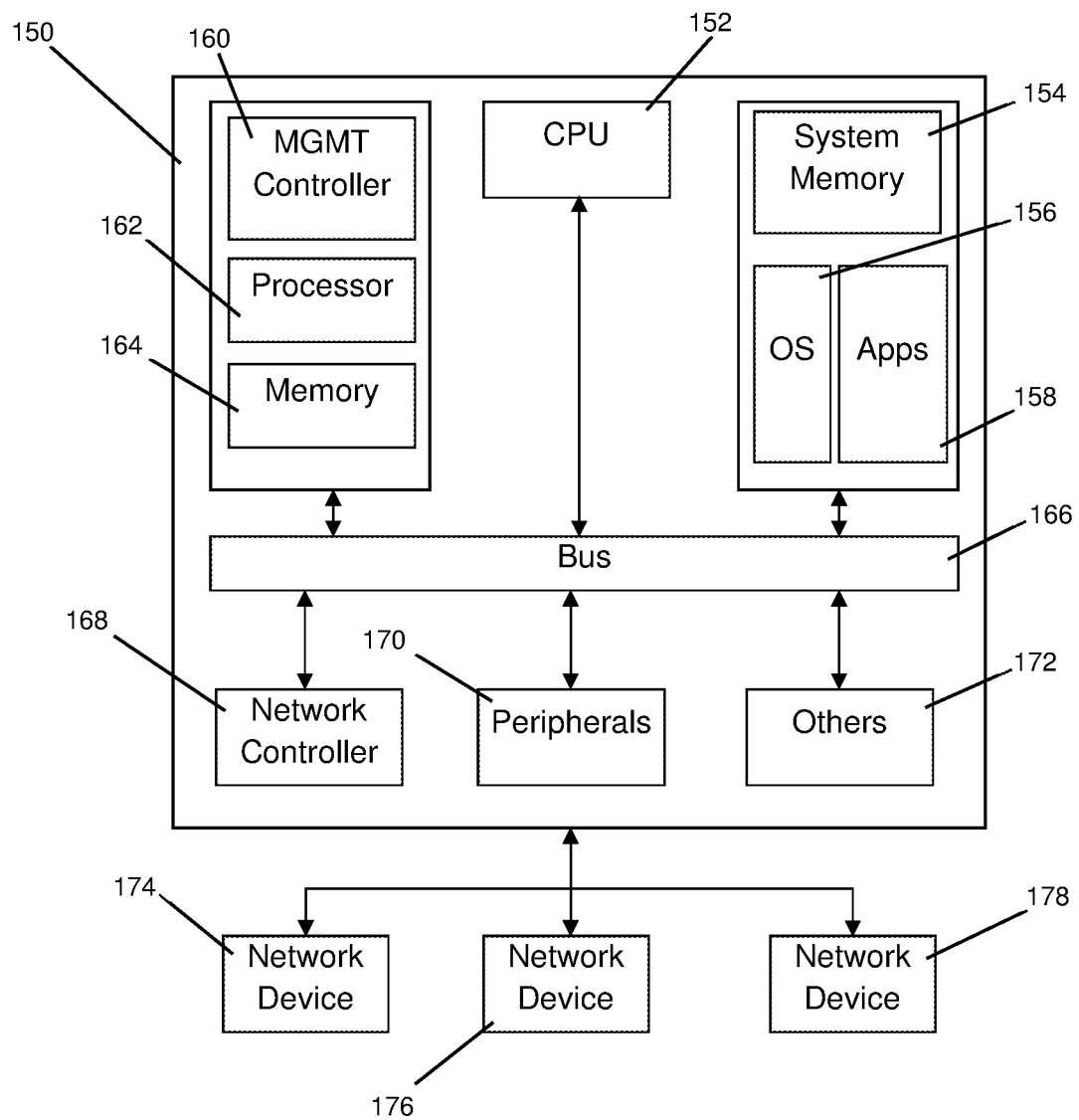

FIG. 6 diagrammatically illustrates an exemplary computing device and environment.

DETAILED DESCRIPTION OF EXEMPLARY EMBODIMENTS

Referring to the drawing figures, like reference numerals designate identical or corresponding elements throughout the several figures.

The singular forms "a," "an," and "the" include "plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

Scalable, universal system interconnects intended to unify communications, simplify designs and solution architectures, and improve interoperability have been proposed; Gen-Z (see genzconsortium.org) and CXL are such currently developed systems. Such systems may use a memory-semantic (i.e., read-write) protocol that enables multiple component types to efficiently communicate, which may enable creating truly disaggregated, composable solutions which may have the ability to logically compose systems with required compute and memory resources that may exist as fluid pools of resources and may be connected through fabric switches. A logical system may be created by dynamically binding the compute and memory resources connected via the, e.g., fabric switches.

Missing from such prior systems, and described herein, is a self-learning adaptive engine which may dynamically detect relationships between subcomponents within the system, and detect usage metrics, including runtime metrics. Runtime metrics may be used to build component relationships and may be used as input when creating logical systems, a methodology which may improve runtime performance and resiliency of a computing ecosystem.

Universal, scalable system-interconnects may be used to connect processor(s), storage(s), and memory(s) in a computing environment, e.g., a datacenter. With reference to Gen-Z as a non-limiting example of such a universal, scalable system-interconnect, a Gen-Z environment may be managed by different managers in various roles, which may include a Primary Manager, a Fabric Manager, a Fabric Director, and a Composability Manager, which have the responsibility of creating logical systems by binding the appropriate resources and enabling the interactions between these resources. See, e.g., Gen-Z Core Specification, Version 1.1 (2020, Gen-Z Consortium), the entirety of which is incorporated by reference herein. In a datacenter, as the number of resources scale up, there may be challenges to find more efficient combinations of compute, memory, and storage systems to create a logical system.

Systems, such as, but not limited to, Gen-Z, which support an asymmetric link define rules and policies in each individual physical layer. An asymmetric link is a physical layer with a different number of transmit versus receive lanes. Asymmetric links enable physical layers to optimize performance, power, and system resources based on the required data bandwidth per direction across a link. Modern applications exhibit large demands for high memory bandwidth, i.e., more memory channels and larger bandwidth per channel. The utilization data, patterns) of link usage, and/or patterns) of lane usage may be gathered to exploit the facilities provided by asymmetric links. In more general terms, usage pattern and consumption data may include one or more of transmission and receiving usage pattern data, runtime configuration data, load pattern data, or combinations thereof.

Data centers may be built with one or more tiers of network hierarchy, and as data moves between tiers, there is may be a reduction in available bandwidth. Gen-Z stresses the importance of keeping bandwidth and network knowledge as Gen-Z reaches multi-rack implementations, as Gen-Z may provide the opportunity to address network oversubscription. According to an example, a mechanism is described which may dynamically improve bandwidth use. A network requirement may be calculated based on an amount of data to be transferred between subcomponents on the network, a desired bandwidth for that transfer, a length of utilization (duration or in burst) of the transfer, one or more queue capacities, one or more link capacities of each component, workload characteristics, and combinations thereof.

Telemetry data from one or more components may be analyzed to evaluate the utilization of components in the computing environment. The components may be any device, chipset, memory DIMMs, bus, bridge, and/or controller that is directly or indirectly associated with the system, e.g., Gen-Z. Currently there are commercially available systems and services which may collect such telemetry data. Component runtime telemetry data may also be obtained from chipset manufacturers, which may include metrics. Based on utilization data, systems as described herein may define an algorithm which can determine the workload running, and may be used to determine how many lanes are required and may be configured, or reconfigured, appropriately to improve efficiency.

The resource aware (e.g., network-aware) workload may provide benefits. Network-aware workload may increase traffic locality to reduce network bottlenecks and decrease latency. Typical workload categories may be defined to assess how changing scenarios can be addressed by a system as described herein. The workloads of a different category have their own resource needs and requirements: low latency workloads, online transaction processing (OLTP), high performance compute (HPC), mission critical workload, online analytical processing (OLAP), I/O throughput, and/or graphic processing.

Support for lane polarity by a system, for example, Gen-Z, includes rules and policies specified in each individual physical layer clause. Physical layers may not require differential connectivity per lane; however, Gen-Z physical layers referencing the Gen-Z Core Specification may support asymmetric transmit and receive widths and ratios as asymmetric links. Gen-Z physical layer clauses (which indicate the physical layer type associated with the interface physical structure) may provide options for advanced management to support runtime reconfiguration based on temporal solution requirements, such as reducing symmetric link width to improve power savings or enabling asymmetry for specific workloads.

Figure 1:
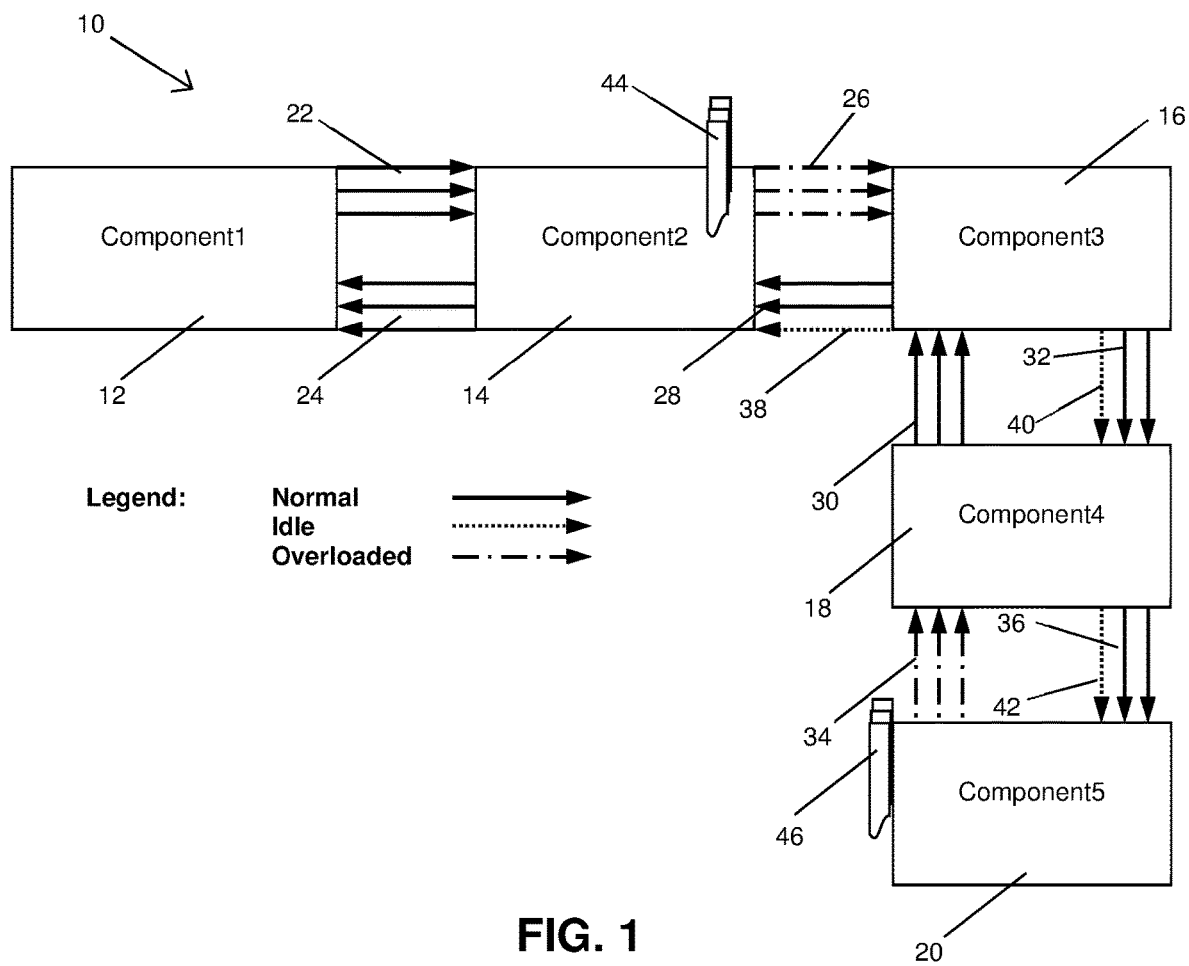
FIG. 1 diagrammatically illustrates an example of server components, interfaces, and asynchronous links therebetween.

FIG. 1 diagrammatically illustrates an exemplary scenario, in which a network 10 includes component1 12, component2 14, component3 16, component4 18, and component5 20, each with transmit (Tx) and receive (Rx) information. Each componentN has a number of links between the component and another component, in this example three Tx and three Rx links.

Tx and Rx links 22, 24 between component1 12 and component2 14 are represented as a normal, balanced transaction, and there are no packets waiting in queue. In component2 14, Tx links 26 are overloaded and packets 44 are queued, and one Rx link 38 of the Rx links 28 is idle, while the remaining two Rx links are completely utilized. Between component3 16 and component4 18, one link 40 each in Tx and Rx are completely idle and the other two links are completely utilized. Component4 18 has overloaded Rx links 34 and packets 46 are queued from component5 20. A Rx link 42 is partially or not used, leaving less two links 36 mostly or completely used.

To correct this situation, one could change an asynchronous link 26, 28 from Rx to Tx for component2 14 to component3 16 to clear the queue for Tx transactions. This change could force links connecting subsequent component(s) to queue work, making it necessary to observe data traffic and tune the links to and from those other components as well.

Systems and processes as described herein may provide a mechanism to route through all components and identify the impact of the tuning of one link's configuration on another component's transactions. The above-described scenario considers one server with limited (five) components. With the complex environment in modern datacenters in which multiple racks are connected, optionally through Gen-Z fabric interconnects, software-defined data fabric networking systems may make the ecosystem complex. To track every individual component, analyze, and tune Tx and Rx links accordingly would be tedious and time consuming. Systems and processes as described herein may provide machine learning, including an artificial intelligence (AI) engine, to evaluate component traffic and provide an improved solution for tuning a component's Tx and Rx links to provide improved performance. The tuning of any single link, e.g., to adjust Rx and Tx, may require the reset of one or more other links and disturb other transactions in a network environment, but a system and process as described herein may address this issue by maintaining a database of every component and link.

As described in greater detail below, systems and processes as described herein may include an engine including AI-fueled analytics to monitor the performance of one or more resources in the network, orchestrate the resources, and provide improved routing between resources, which may include using one or more features of a resource including configuration of asymmetric links, lane polarity, and enqueue-dequeue. Systems and processes as described herein may include an engine that may gather information from various components, an exemplary logical system of which is outlined below.

An example of a logical system may be a webserver, a database server, and/or, in general, an analytics engine with "x" amount of processing, "y" amount of memory, and "z" amount of storage bound together through a protocol in a scalable, universal system interconnect, e.g., Gen-Z, with switches. A Composability Manager may keep track of the various resources that are available for creating logical systems. The Composability Manager may be able to execute a request for creating a logical system by quickly allocating the required amount of compute, storage, and memory resources in the environment.

Each component core structure, link structure, or both, may have a telemetry block. Using data in a telemetry block from one or more component core structure, link structure, or both, a management entity may directly rely on the telemetry block to retrieve the utilization data of the one or more component core structure, link structure, or both and use it for analytics and to determine appropriate tuning to make the system more efficient.

As briefly discussed above, asymmetric link support, including rules and policies, may be specified in each individual physical layer clause. The link width of a physical layer is defined as the number of physical lanes in its implementation. By way of a non-limiting example, physical layers referencing the Gen-Z core specification may support link widths of 1, 2, 4, 8, 16, 32, 64, 128, and 256 lanes; any number of link widths may also be supported, including all numbers of lanes between 1 and 256, or more widths. Two independent devices may implement the same physical layer with different link widths. A system as described herein includes a mechanism to negotiate to a common link width, which in the Gen-Z example may be The Physical Layer Training State Machine (PLTSM) specified in the Gen-Z Common Specification. An enqueue request packet may transport a data payload that is automatically added to the tail of a shared or dedicated queue (e.g., a completion queue) transparently associated the RSPCTXID. RSPCTXID is Requester to a Responder Context Identifier located at the responder. A write message request packet targets an anonymous buffer associated with a RSPCTXID.

Payload contents and semantics may be application specific, e.g., the payload may contain application-specific work requests driven by software or embedded hardware logic, application-specific meta-data or completion data associated with a data buffer (e.g., a description of a completed buffer put operation), etc. A dequeue request packet requests the responder to atomically release and return a single queue entry from the head or tail of a shared or dedicated queue transparently associated with the RSPCTXID.

The physical interconnect may be an independent layer in the system. Physical layer independence means all physical layer characteristics and operating semantics are isolated below the system's physical layer abstraction. The system may include the ability to support automatic, real-time power optimizations based on workload needs, e.g., the ability to burst data across a link and then automatically power down a subset of lanes based on the transmit queue depth or to only power up a subset of the lanes to meet packet latency or throughput requirements.

Figure 2:
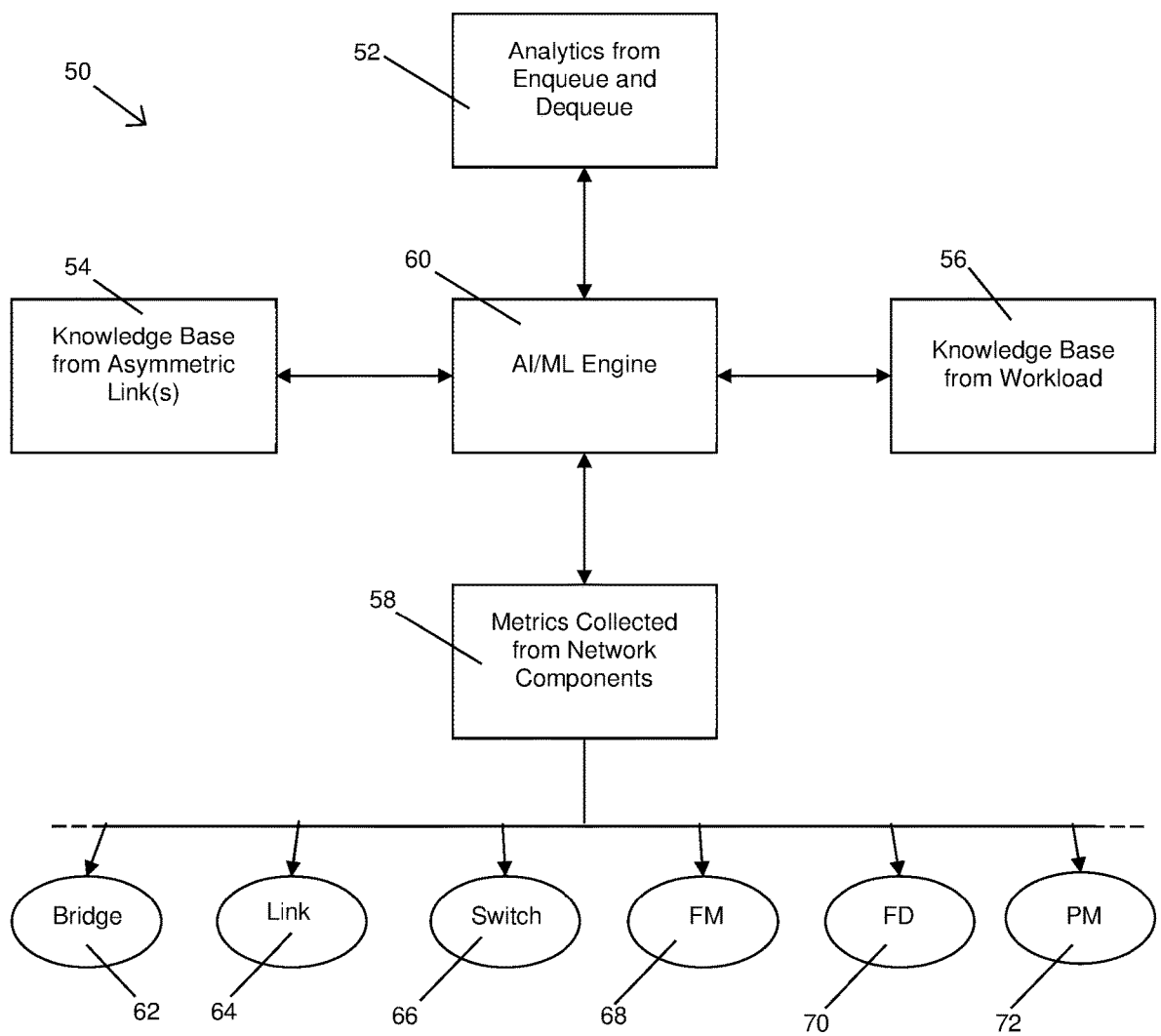
FIG. 2 diagrammatically illustrates an exemplary system.

FIG. 2 illustrates an example system 50. An artificial intelligence (AI) engine flow illustrated in FIG. 2 may include several engines, which may include one or more of: metrics collected from network components 58; a knowledge base from asymmetric link(s) 54; a knowledge base from workload 56; and/or analytics from enqueue, dequeue 52. The AI/Machine Learning (ML) engine 60 may collate data and/or usage patterns from all the components to make decisions on improving the efficiency of the network. Network components may include, but is not limited to, bridges 62, links 64, switches 66, fabric manager 68, fabric director 70, and primary manager 72. The data points collected by AI/ML engine 60 may provide queue capacity and link capacity of each component, details of each component utilization, maximum capabilities of components, and/or workload for the setup that is or will be required.

By way of a non-limiting example, analytics from enqueue, dequeue 52 monitors and manages metrics and pattern data collected from shared and/or dedicated queue(s) on the network.

By way of a non-limiting example, knowledge base from asymmetric link(s) 54 may gather and monitor data concerning the patterns) of lane usage, link usage, and utilization, in order to exploit benefits of the use of asymmetric links. Gathering lane usage information may assist deciding when to change the lane type from unidirectional to bidirectional. Gathering link usage information may assist deciding how many Rx and Tx are needed for a particular component for a given workload. Gathering utilization data may assist deciding how many components of a particular type is needed for a given workload.

The data gathered and monitored at a knowledge base from asymmetric link(s) 54 may enable runtime reconfiguration, including, but not limited to, reducing symmetric link width to improve power savings and/or enabling link asymmetry for specific workloads. Put in general terms, a knowledge base from asymmetric link(s) 54 may support different numbers of transmit versus receive lanes based on the dynamic need of the network.

By way of a non-limiting example, a knowledge base from workload 56 may collect usage and pattern data from one or more workloads on the network, including but not limited to: High Performance Compute (HPC) workloads (e.g., large-scale scientific and engineering workloads); online transaction processing (OLTP); mission critical workloads; online analytical processing (OLAP); graphic processing; low latency workloads; GPU accelerated simulation workloads; fluid workloads; flex workloads; and stack workloads. For each workload, data may be collected such as a time stamp of the data, component ID, capacity of the component, utilization percentage of the component, number of received packets, number of transmitted packets, a successor component, and/or a predecessor component.

Figure 3:
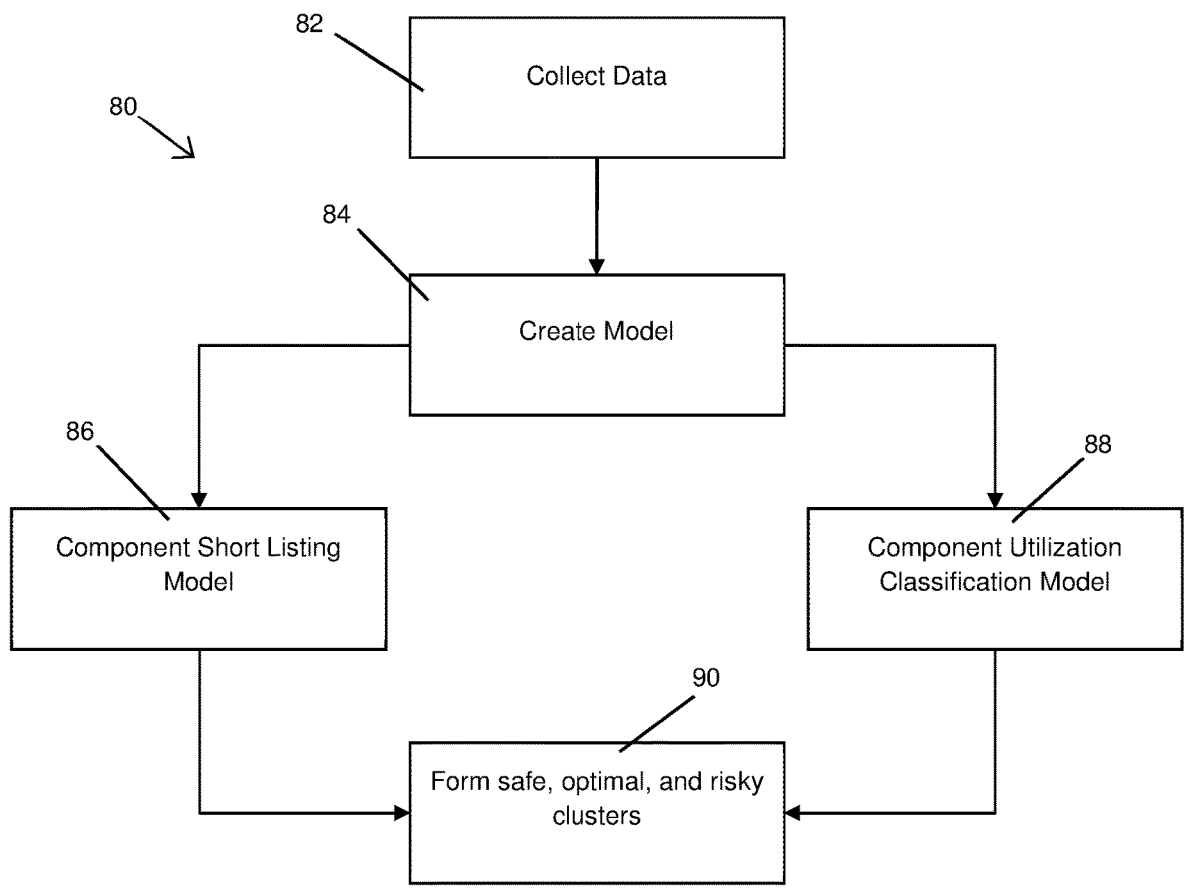
FIG. 3 diagrammatically illustrates a first exemplary process flow.

FIG. 3 illustrates a flowchart of an exemplary initialization process 80 of a system as described herein, such as system 50 of FIG. 2. Data is collected at step 80 from, e.g., analytics 52, metrics 58, and/or knowledge bases 54, 56, and is passed to AI/ML engine 60. AI/ML engine 60 may then study metrics from these network resources to train the AI/ML model, which may include metrics concerning the kind of workload, and respective resource requirements and characteristics.

Data from link, lane, and usage pattern(s), which may be based on the system enabling asymmetric links, which may enable different number of transmit versus receive lanes based on the dynamic need of the network, including transmit-receive usage pattern, runtime configuration, and their respective load patterns(s), may be collected and by the AI/ML engine 60 to collate data, and create and train a model of the network at step 84 based on the data collected in step 82. As discussed above, for each workload, data may be collected such as a time stamp of the data, component ID, capacity of the component, utilization percentage of the component, number of received packets, number of transmitted packets, a successor component, and/or a predecessor component. Once the model has been created, the AI/ML engine 60 generates a component short listing model 86 and a component utilization classification model 88. Component short listing model 86 and component utilization classification model 88 may be provided to let the user know at what rate each component shortlisted will be utilized according to the estimation, so that if the user wants a different, e.g., safer setup, the user may increase the component(s) which are being over utilized. Stated somewhat differently, when a user determines a workload, systems and processes as described herein may determine a setup with component(s) involved and their expected utilization when the (pre-)determined workload has run on them.

AI/ML engine 60 then uses models 86 and 88 to generate at least one, advantageously more than one, component clusters having different efficiency characteristics, e.g., safe, optimal, and risky clusters. By way of a non-limiting example, during runtime, if there is congestion from a component to another component, i.e., bottlenecks, which may be quantified as any non-zero congestion, systems and processes described herein categorize the component set(s) involved as a "risky" cluster. Otherwise, if there is no congestion, that cluster may be categorized as "optimal." If the cluster is faster than expected, that cluster may be categorized as "safe."

The formation of a risky cluster may have two use cases: if all the parameters are the same, as between a prior determination by systems and processes described herein and actual run time, and thus the cluster remains categorized as "risky", differences between the two may be determined, and these differences used to train the model. A user may also pin-point at which component(s) the delay(s) is (are) being caused. Further optionally, revision of a cluster may also be performed to address issues concerning a network, hardware, power backup, and the like. By way of a non-limiting example, from the knowledge base for a given workload, a shortlist of a number of components required for each component type may be compiled. Assuming three types of Workload W1, W2, W3 (W1—mission critical workload, W2—Moderate workload, willing to afford downtime in an unprecedented scenario, W3—Non-critical workloads), W1 needs Comp1, Comp2, Comp3 types:

| Usage | Comp 1 | Comp 2 | Comp3 |
|---|---|---|---|
| Above >75 | 2 | 5 | 1 |
| Moderate (50-75) | 3 | 7 | 2 |
| Less <50 | 5 | 10 | 3 |

Figure 4:
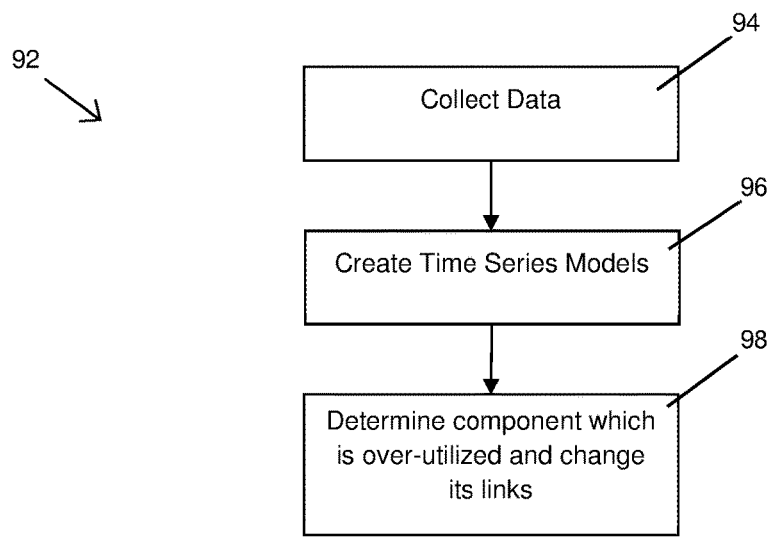
FIG. 4 diagrammatically illustrates a second exemplary process flow.

For a given workload there may be numerous solutions; in this example, there are three:
Safe: Cluster with Less than 50% utilization
Moderate: cluster between 50-75 percent utilization
Risky: Cluster with above 75% utilization FIG. 4 illustrates a flowchart of an example runtime process 92 of an initialization of a system as described herein, such as system 50 of FIG. 2, which may occur after an initialization process 80. Data is collected about the network at step 94, from, e.g., analytics 52, metrics 58, and/or knowledge bases 54, 56, and is passed to AI/ML engine 60. AI/ML engine 60 then creates time series models 96 based on the current data from step 94 and the sets of clusters determined in step 90 of the initialization process 80. Time series models 96 assume that, apart from component utilization data and setup, time at which the workload is run may also be a factor to be accounted for. For example, once a setup has been determined for optimal utilization and setup for the first one hour, it may be an optimal cluster, but after two hours it may turn out to be a risky cluster by, e.g., unexpected user behavior of using the setup or some component behavior change after using for a particular time interval. Again by way of a non-limiting example, a user may have preferred an Optimal cluster with 50-75 percent utilization expected for every component in the cluster; however, for unforeseen reasons when a component is more than 75 percent utilized, this cluster is then re-characterized as a risky cluster. This re-characterization thus allows a user to decide whether to add additional component(s) to the cluster to and make the cluster a moderate cluster. Similarly, underutilized components in a cluster may be identified and may be used for other workloads.

Based on the time series models created at step 96, the AI/ML engine 60 then may determine at step 98 which component or components in the network are overutilized, and which are underutilized. The AI/ML engine 60 then may change the links to the overutilized component(s) to reduce the utilization of that/those components, increase the utilization of underutilized components, or both, based in part on the models of the network created by the AI/ML engine 60.

Non-limiting examples of AI engines that may be used to implement aspects of the subject matter described herein include TensorFlow, Keras, Scikit-learn, Microsoft Cognitive Toolkit, Theano, Caffe, Torch, Accord.net, among other currently commercially available AI engines. Based on the knowledge bases 54, 56, analytics 52, and metrics 58, AI/ML engine 60 may prepare consumption data which may include how data payload and requests are handled in different scenarios for different workload(s), and/or dynamic handling of lane(s) and/or link(s), and/or how they are loaded. The AI/ML engine 60 may then perform predictive analytics based on the gathered data and may provide early warning concerning emerging conditions, produce actionable notifications, and/or provide metered licensing and/or consumption.

Component utilization classification model 88 uses component utilization data to classify every component on the network into a number of utilization categories. By way of a non-limiting example, categories may include "Underutilized", "Optimal", "At highest capacity", and "Overutilized." The classification model may remain static; however, if the capabilities of any component changes, then the model may be retrained. For example, there may be one static model which gives the details of a number of components of each type needed for a given work load at various utilizations. Another model continues to collect dynamic data and responds in a runtime environment when a component state changes and cluster type changes. The static model may change when changes in cluster types during run time environment are observed. The model may then be again retrained with the latest data collected and make that retrained model static. The static model is thus the model which forecasts capacity of a component for a given workload, while a dynamic model may continue to validate the forecast of the static model. Whenever there is a disagreement between the two models for a given workload, retraining is performed with the latest data which was collected during the period that the two models disagreed.

Component shortlisting model 86 may include shortlisting the types of components required, based on a workload, calculating what is the workload on each type of components, taking optimal utilization parameters and calculate the number of components required of each type of component, and generating a setup. If, however, enough components are not available to generate a setup, model 86 switches to higher utilization parameters until a setup can be generated.

Link utilization data may be used by AI/ML engine 60. More specifically, AI/ML engine 60 may take each type of component data, broken down into a plurality of types. By way of a non-limiting example, three types may include: one to one; many to one; and one to many. Based on the data available, AI/ML engine 60 classifies each component into one of the above classification types, the data including input packet count and output packet count. Once the utilization percentage, input packet percentage, and output packet percentage of a link is determined for a particular type of workload, AI/ML engine 60 changes links on the network into that particular percentage.

AI/ML engine 60 may also be trained to handle queues. In one example, a queue can only be formed when data is pushed from component to component. After the setup is ready, see, e.g., step 90 in FIG. 3, optionally data from steps 82-90 as a benchmark against run time data, dummy packets are run through the network at highest capacity and bottlenecks are identified, e.g., where packets are queued more than at other components. For any identified bottleneck, that component's input and output link utilization score is determined; if bandwidth is available, links are switched between transmit and receive and dummy packets are again run, and this process is repeated until all bottlenecks are minimized or completely resolved. In the event bandwidth is not available, AI/ML engine 60 determines if another component can be added to take on some of the data traffic, and if so, that component is added. If another component is not available, the source for the queue is located and its output link may be changed to be an input link, and dummy packets are again run until the bottleneck is minimized or completely resolved.

Figure 5:
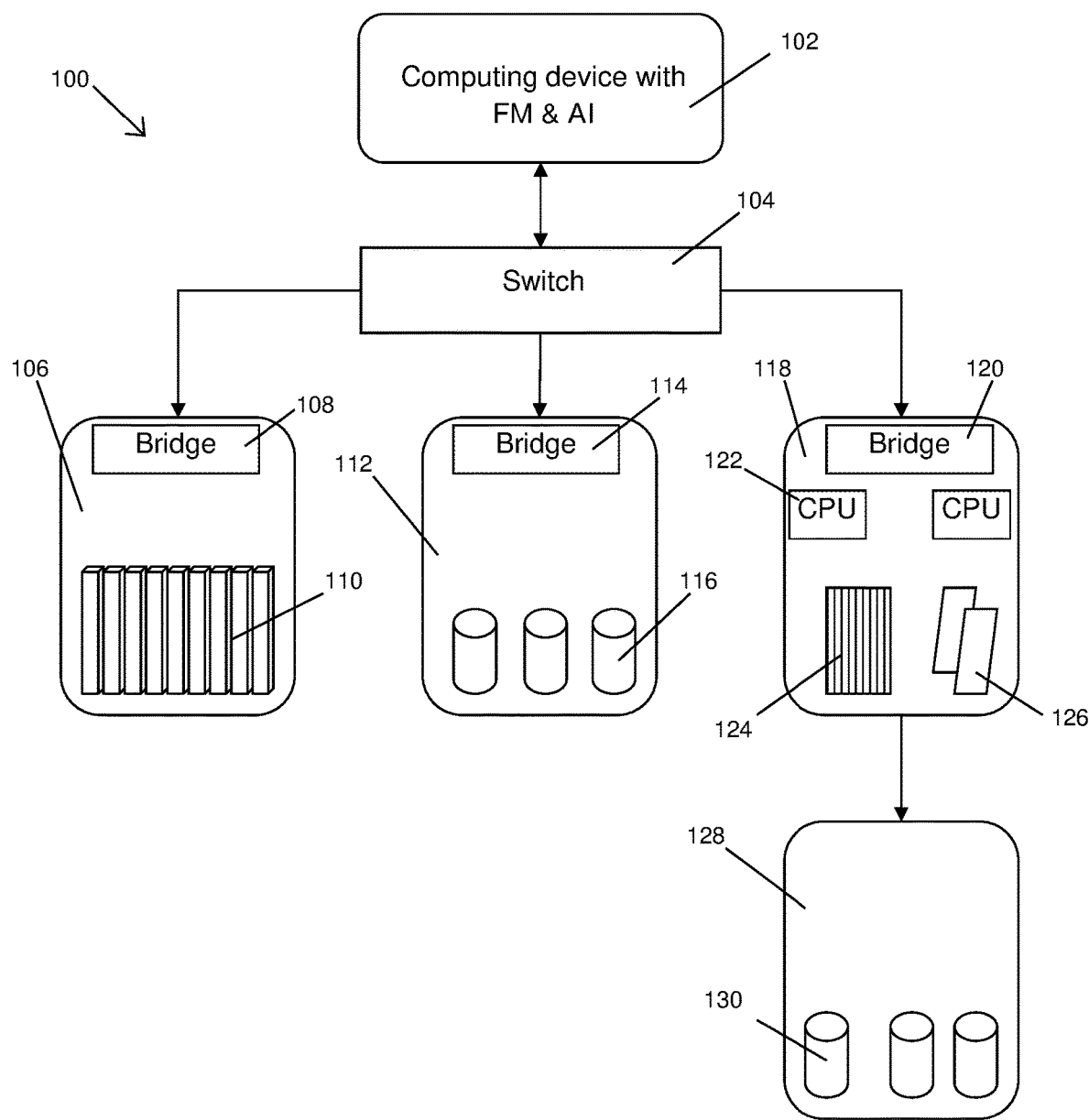
FIG. 5 diagrammatically illustrates an exemplary computing environment.

AI/ML engine 60 may be trained using data and utilization patterns from various components. FIG. 5 illustrates an example ecosystem 100 with example components, which may be Gen-Z components, to illustrate data that may be gathered by the AI/ML engine 60. The ecosystem 100 may include a computing device 102, which may be a server, on which a fabric manager FM and AI/ML engine may be executed. A switch 104 is in communication with the computing device 102 to receive and forward data between the computing device and other components in the ecosystem. By way of non-limiting examples, switch 104 can be in communication with a fast access memory (FAM) component 106, which may include a bridge 108 and a pool 110 of memory; a storage enclosure component 112, which may include a bridge 114 and one or more memory storage devices 116; a compute node 118, which may include a bridge 120, one or more central processing units (CPU) 122, local memory 124, and input/output devices 126; and/or a storage area network (SAN) device 128, which may include one or more memory storage devices 130.

In general terms, managers may be responsible for one or more of handling transmission, reception, load, performance management, tuning the system based on workload, and dynamic speed.

Notifications may be made to a fabric manager and/or a composability manager from individual components in an ecosystem, and their interfaces, for, Tx/Rx overhead/idle notification based on a packet queue mechanism; error notification upon failure of lanes within links; and/or performance degradation notification from one or more applications executing within the ecosystem. Accordingly, a data set to feed this data to AI/ML engine 60 may include data representative of the ecosystem topology and connected hardware, and data representative of individual component details, and/or dynamic speed, bandwidth, and/or performance data.

Data representative of the ecosystem topology and connected hardware may include data necessary to find a component reaching path from top to bottom, to determine a complete path link speed, and thus to determine which link or links, when modified, result in better performance. This may include identification and feeding of ecosystem topology, which may be Gen-Z datacenter topology, managed by managers, which may be Gen-Z managers. For each topology, the data may include identification data representative of physical hardware involved, e.g., compute node 118, switch 104, Bridges 108, 114, 120, among others. For each physical hardware device, identification data representative of individual components residing inside the enclosure of each hardware device, e.g., CPU, memory, PCI cards, bridge, and the like. Furthermore, the data may include data representative, for each individual component, of an identification and feeding component structure and its supported type of component, e.g., CPU, memory, PCIe links, lanes, speed, peer components, and the like.

Data representative of individual component details, and/or dynamic speed, bandwidth, and/or performance data may include data representative of a history of the performance of one or more components in the ecosystem 100, up to and including all components in the ecosystem, which may be used to trigger a notification based on a threshold value derived from data representative of the past performance of the component. This may include data representative of peak or idle Tx/Rx based on a packet queue mechanism for every component interface; duration that a peak/idle Tx/Rx remains in the same state, for which the notification may be specified; date and time at which a peak/idle Tx/Rx remains in the state; if an interface is at peak or idle, collecting the remaining interface link information of that particular component; application performance based on workload; and/or individual component performance.

The data held by AI/ML engine 60 may provide a complete link path for a component to reach another component to process data for performance better than if a different link path was used. This may include data identifying the components data traverses to process the data; the components types and speed; tuning which lanes gives improved performance; an analysis of how changing overhead/idle Tx/Rx links results in improved performance; and/or an analysis of how changing the speed of other links results in improved performance.

In summary, systems and processes described herein may monitor bandwidth and/or usage information of components in a network ecosystem, which may be a Gen-Z-compliant network, with an AI/ML engine. An AI/ML engine may make use of various components, which may be Gen-Z components, to gather data, metrics, and apply analytics on the data and metrics. The data captured may significantly help to make the resources intelligent and handle the dynamic requirements and runtime configurations of the network ecosystem. The network ecosystem may thus have a manager, which may be a Gen-Z manager, to monitor link usage and lane usage. The manager components may be a fabric manager and/or a composability manager for this network monitoring.

A self-learning model as described herein may create a logical system, which may be a Gen-Z fabric environment, which may construct a topology map and resource matrix that reflects the actual load and cost of connectivity between the network's components, and may include these metrics in the process of creating the logical system. Such a self-learning, adaptive model may be built into a manager, e.g., a composability manager engine, enabling the, e.g., composability manager to effectively and efficiently allocate network resources for logical binding of the system using the pool of resources that are available in environment.

In a network ecosystem, which may be a Gen-Z-compliant network, components support asymmetric links which may tailor bandwidth based on specific needs. The manager is able to collect the status of every link for some interval time, which may include statuses such as active and idle, active bandwidth information, and based on historical data about the network's performance, a system as described herein may configure one or more of the network's link's speed accordingly. That is, a system as described herein may use artificial intelligence concepts based at least in part on historical data representative of the performance of the network. Optionally, a system as described herein may be constructed as a separate component structure within or with access to the network, and which acts as an AI element. Further optionally, data upon which an AI/ML engine, such as engine 60, operates may in part or in whole be based on one or more predefined application requirements, rather than or in addition to other data sources described herein, to configure one or more network links.

By dynamically tracking link utilization and partitioning lanes in one link between receive and transmit directions, an AI/ML engine as described herein may allocate more lanes to transmit if servicing read-intensive applications, for example, and in doing so may reduce lane contention along that direction and thus the average memory access latency.

Systems as described herein may overall enhance execution time, improve rapid responsiveness, improve bandwidth utilization, and reduce or nullify latency.

Turning again to the figures, FIG. 6 is a diagram illustrating an exemplary embodiment of a computing environment such as system 150 which may be useful for deploying computing systems and devices such as described herein. As shown in FIG. 6, the system 150 may include a management controller 160, a processing element 152 which includes hardware, which may include one or more of a central processing unit (CPU), a graphical processing unit (GPU), and the like, and system memory 154. Optionally, multiple systems such as system 150 may be utilized together.

In some embodiments, the system 150 may include various other hardware including a network controller 168, one or more peripheral devices 170, and other devices 172 known to those of skill in the art. The components of the system 150, including those illustrated in FIG. 6, may be connected to each other via a system bus 166 that enables communications therebetween. Management controller 160 may include a processor 162 and a memory 164, and system memory 154 may allocate space for, e.g., an operating system 156 and one or more applications 158. As discussed elsewhere herein, system 150 may be in communication on network with one or more network devices or components 174, 176, 178. It should be understood that the system 150 can include more or fewer components than those illustrated in FIG. 6. Moreover, in some embodiments, the components of system 150, such as those illustrated in FIG. 6, are provided within a single case or housing (not illustrated per se), and/or physically attached thereto. Furthermore, the same or different processing elements may be used to train a model, and/or allocate and bind network resources as described elsewhere herein.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

That which is claimed is:

1. A system to allocate network resources including an asymmetric link and at least one of a bridge, a switch, or a fabric manager, the system comprising:
   a processor; and
   a non-transitory storage medium storing instructions executable on the processor to:
   access a database comprising historical asymmetric link data and further data selected from among workload data, enqueue analytics data, dequeue analytics data, or combinations thereof;
   extract usage pattern and consumption data from the database and the network resources, and generate metrics from the usage pattern and consumption data, wherein the usage pattern and consumption data comprises link usage information associated with asymmetric links and lane usage information associated with lanes of the asymmetric links, the link usage information and the lane usage information gathered based on monitoring patterns of usage of the asymmetric links and the lanes of the asymmetric links;
   train a machine learning engine based on the metrics to form a model; and
   allocate and bind the network resources based on the model, including changing a link speed between at least two of the network resources at an asymmetric link of the asymmetric links, or changing a direction of a lane between at least two of said the network resources at an asymmetric link of the asymmetric links, or both.

2. The system according to Claim of claim 1, wherein the instructions are executable on the processor to:
   create a network topology map based on the model.

3. The system of claim 1, wherein the instructions are executable on the processor to use the link usage information and the lane usage information to determine a quantity of transmit lanes and receive lanes for a component to execute a workload.

4. The system of claim 1, wherein the instructions are executable on the processor to determine, using the lane usage information, whether a lane type is to be changed from unidirectional to bidirectional.

5. The system of claim 1, wherein the lane usage information comprises a transmit-receive usage pattern of the lanes of the asymmetric links.

6. The system of claim 1, wherein the instructions are executable on the processor to, after forming the model:
   generate a component short listing model; and
   generate a component utilization classification model.

7. A method for allocating network resources including an asymmetric link and at least one of a bridge, a switch, or a fabric manager, the method comprising:
   accessing, by a system processor, a database comprising data selected from among historical asymmetric link data, workload data, enqueue analytics data, dequeue analytics data, or combinations thereof;
   extracting, by the system processor, usage pattern and consumption data from the network resources and the database, and generating metrics from the usage pattern and consumption data, wherein the usage pattern and consumption data comprises lane usage information and link usage information associated with asymmetric links;
   training, by the system processor, a machine learning engine based on said the metrics to form a model;
   allocating and binding, by the system processor, the network resources based on the model, including changing a link speed between at least two of the network resources at an asymmetric link of the asymmetric links, or changing a direction of a lane between at least two of the network resources at an asymmetric link of the asymmetric links, or both; and
   determining, by the system processor using the lane usage information, whether a lane type is to be changed from unidirectional to bidirectional.

8. The method of claim 7, further comprising:
   creating, by the system processor, a network topology map based on the model.

9. The method of claim 7, wherein the usage pattern and consumption data comprises transmission and receiving usage pattern data, runtime configuration data, load pattern data, or combinations thereof.

10. The method of claim 8, wherein the allocating comprises changing overhead and/or idle transmission and/or receiving links between at least two of the network resources.

11. The method of claim 8, wherein the lane usage information is associated with lanes of the asymmetric links, and the link usage information and the lane usage information are gathered based on monitoring patterns of usage of the asymmetric links and the lanes of the asymmetric links.

12. The method of claim 8, wherein changing the direction of the lane comprises changing the direction of the lane between a transmit direction and a receive direction.

13. A non-transitory machine-readable medium storing instructions which, when executed, cause a system in communication with network resources including an asymmetric link and at least one of a bridge, a switch, or a fabric manager to:
  access a database comprising historical asymmetric link data and further data selected from among workload data, enqueue analytics data, dequeue analytics data, or combinations thereof;
  extract usage pattern and consumption data from the database and the network resources, and generate metrics from the usage pattern and consumption data, wherein the usage pattern and consumption data comprises lane and link usage information associated with asymmetric links and lane usage information associated with lanes of the asymmetric links, the link usage information and the lane usage information gathered based on monitoring patterns of usage of the asymmetric links and the lanes of the asymmetric links;
  train a machine learning engine based on the metrics to form a model; and
  allocate and bind the network resources based on the model, including changing a link speed between at least two of the network resources at an asymmetric link of the asymmetric links, or changing a link direction between at least two of the network resources at an asymmetric link of the asymmetric links, or both.

14. The non-transitory machine-readable medium of claim 13, storing wherein the instructions when executed cause the system to:
  determine, using the lane usage information, whether a lane type is to be changed from unidirectional to bidirectional.

15. The non-transitory machine-readable medium of claim 13, wherein the usage pattern and consumption data comprises transmission and receiving usage pattern data, runtime configuration data, load pattern data, or combinations thereof.

16. The non-transitory machine-readable medium of claim 13, wherein the allocating comprises changing overhead and/or idle transmission and/or receiving links between at least two of the network resources.

17. The non-transitory machine-readable medium of claim 13, wherein the allocating comprises:
  dynamically allocating a data lane or a data link; and
  dynamically loading the data lane and the data link.

* * * * *